United States Patent [19]
Shibao et al.

[11] Patent Number: 5,355,445
[45] Date of Patent: Oct. 11, 1994

[54] KNOWLEDGE BASE MANAGEMENT SYSTEM FOR AN INFORMATION REASONING APPARATUS

[75] Inventors: Kouichi Shibao; Yukinori Osada; Makoto Shimizu; Tadashi Nishimura, all of Ichihara, Japan

[73] Assignee: Mitsui Petrochemical Industries, Ltd., Tokyo, Japan

[21] Appl. No.: 865,186

[22] Filed: Apr. 8, 1992

[30] Foreign Application Priority Data

Apr. 25, 1991 [JP] Japan .................................. 3-95858
Apr. 26, 1991 [JP] Japan .................................. 3-97750

[51] Int. Cl.$^5$ ...................... G06F 15/18; G06F 15/40
[52] U.S. Cl. .................................. 395/54; 395/600
[58] Field of Search ............... 395/54, 919, 51, 52, 395/54, 906, 919

[56] References Cited

U.S. PATENT DOCUMENTS

| 4,930,071 | 5/1990 | Tou et al. ............... | 364/300 |
|---|---|---|---|
| 4,943,933 | 7/1990 | Miyamoto et al. .......... | 364/513 |
| 5,136,523 | 8/1992 | Landers .................. | 395/54 |
| 5,228,116 | 7/1993 | Harris et al. ............ | 395/54 |

OTHER PUBLICATIONS

Capraro et al., "Large Knowledge Based Systems: An Efficient Approach," Proc. Annual AI Systems in Govt. Conf., Mar. 1989, 58–65.

DeBloch et al., "KRISYS: KBMS Support for Better CAD Systems," Sec. Intl. Conf. on Data and Knowledge Systems for Manuf's Engr., Oct. 1989, 172–182.

Howard et al., "KADBASE Interfacing Expert Systems with Databases," IEEE Expert, Fall 1989, 65–76.

Finin et al., "The Intelligent System Server Delivering AI to Complex Systems" IEEE Intl. Workshop on Tools for A.I., Oct. 1989, 306–313.

Michelsen et al., "Experiences with Knowledge-Base and Proc. 23rd Annual Hawaii Intl. Conf. on System Sciences", Jan. 1990, 25–34.

Tesch et al., "A Knowledge-Based Alarm Processor for an Energy Management System," IEEE Trans. on Power Systems, Feb. 1990, 268–275.

Nurcan et al., "An Advanced Knowledge Base Management System Based on the Integration of Logic Programming and Relational Databases," 5th Annual European Computer Conf., May 1991, 740–744.

Patent Abstracts of Japan, vol. 16, No. 308 (Japanese Publication No. JP 40 84 333) (1992).

Yang et al, IEEE Transactions on Nuclear Science, vol. 36, No. 6, pp. 2450–2458 (1989).

Cheng et al, Proceedings of the 2nd International IEEE Conference on Tools for Artificial Intelligence, Herndon, VA, pp. 792–796 (1990).

Toshihisa Takagi et al.; "Applicability of a Deductive Database to CAD Systems", 8 pages; Apr. 10, 1991.

*Primary Examiner*—Robert W. Downs
*Attorney, Agent, or Firm*—Birch, Stewart, Kolasch & Birch

[57] ABSTRACT

A knowledge base management system and method for managing a knowledge base system which includes a primary data storage section storing received primary data. A change registration section records change data indicating which of the primary data has been changed. A data conversion section converts the primary data into secondary data which has a data format compatible with the knowledge base system. A knowledge base section has a secondary data storage section which stores the secondary data, and a reasoning calculation section accesses the secondary data based on a received retrieval inquiry. A knowledge management section controls the conversion section. Specifically, the knowledge management section controls the conversion section to convert the primary data corresponding to the secondary data to be accessed by the reasoning calculating section when the recorded change data indicates that the primary data corresponding to the secondary data to be accessed by the reasoning calculating section has been changed.

14 Claims, 9 Drawing Sheets

FIG. 3

CORRESPONDENCE BETWEEN SYMBOLS IDENTIFIER AND ENTITY IDENTIFIER

| ENTITY | SYMBOLS |
|--------|---------|
| N1023  | S1023   |
| N1024  | S1024   |

CORRESPONDENCE BETWEEN ENTITY IDENTIFIER AND ATTRIBUTES IDENTIFIER

| ENTITY | ATTRIBUTES |
|--------|------------|
| N1023  | 'D-201'    |
| N1024  | 'L-101'    |

SORTING NAME / IDENTIFIER CODE.

| SORTING NAME | IDENTIFIER NAME |
|--------------|-----------------|
| DRUM         | 'D-201'         |

FIG.4

BLOCK

```
plant(A).
draw(d2021).
code(n1024.drum).
key(n1023.'D-201').
connect(n1023.n1024).
attr('D-201'.dia.150).
attr('D-201'.tl.150).
attr('D-201'.Pd.150).
attr('D-201'.Po.150).
```

FIG.6

EXAMPLES OF ITEMS OF DATA
CHANGE REGISTRATION TABLE

| DATA NANES<br>(NANES OF DATA ITEMS) | item |
|---|---|
| CHANGE FLAG | flg |
| DATE OF LAST CHANGED DATA | D1 |
| DATE OF LAST CHANGED SECONDARY DATA | D2 |
| POINTER OF UPPER-CLASS DATA ITEM | P1 |
| POINTER OF LOWER-CLASS HEAD DATA ITEM | P2 |

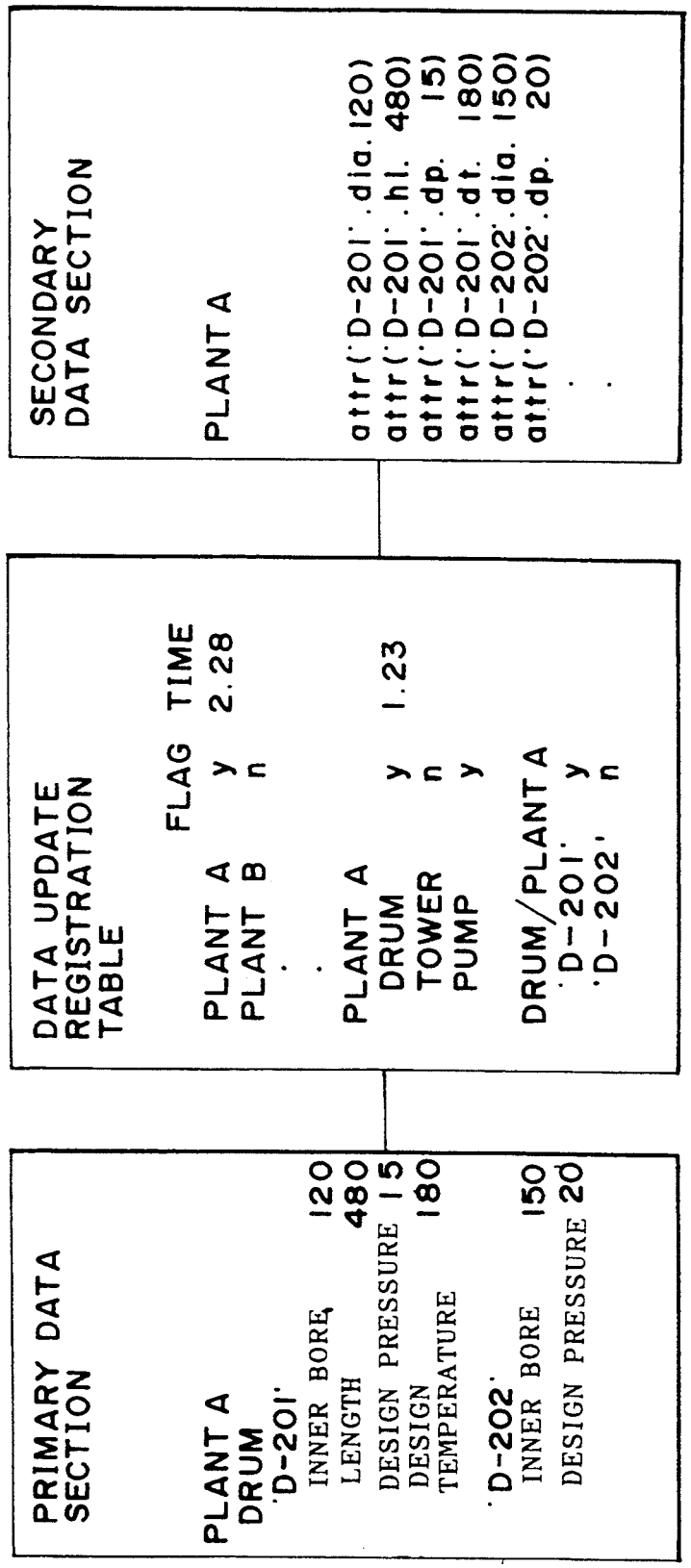

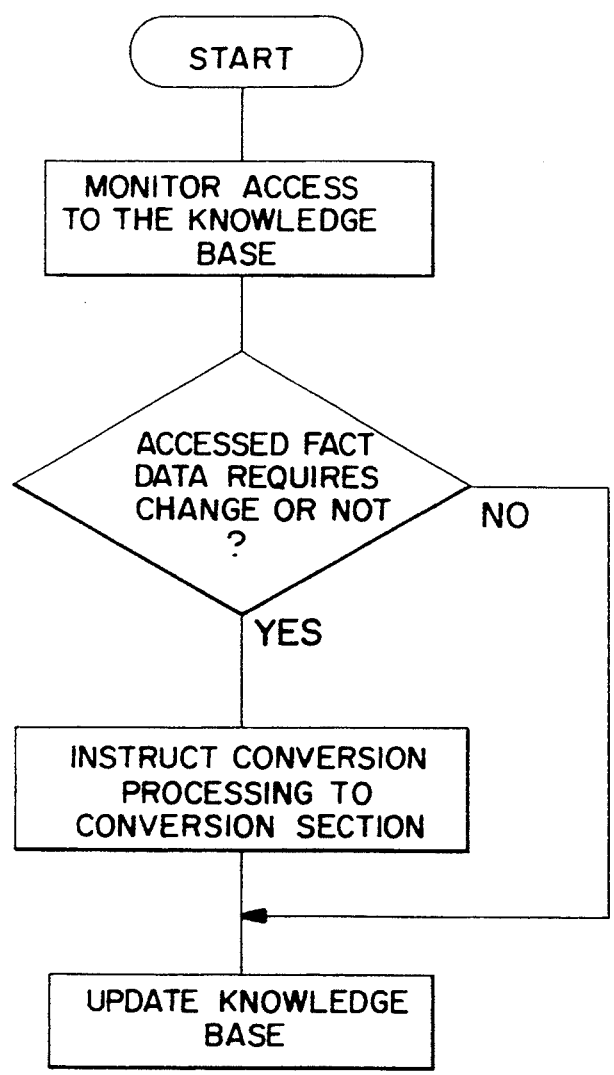

FIG.9

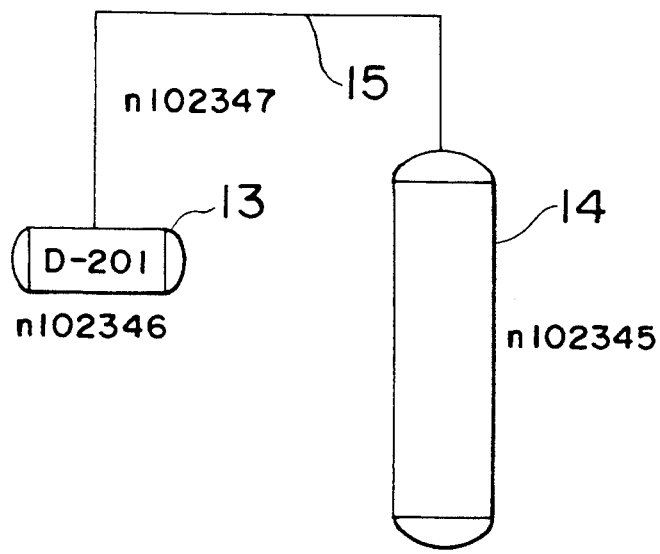

FIG.10

| NODE NUMBER | n102346 |
|---|---|
| SYMBOL NAME | drum |
| CLASSIFICATION CODE | c-101 |
| NUMBER OF PRIMITIVE | 4 |
| PRIMITIRE IMFORMATION | |
|    PRIMITIVE NUMBER | 1 |
|    KIND OF PRIMITIVE | STRAIGHT LINE |
|    PARAMETER | 0 |
|    POSITION INFORMATION | (1492.280) |
|    (COORDINATE: X,Y ) | (1492.380) |
|    PART INFORMATION | 2 |

FIG.11

| NODE NUMBER | n102346 |
|---|---|
| NUMBER OF CONNECTING POINT | 1 |
| CONNECTING POINT INFORMATION | |
|    CONNECTING POINT NUMBER | 2 |
|    CONNECTING POSITION NODE NUMBER | n102347 |
|    CONNECTING PART | 1 |

FIG.12

| GROUP DISCRIMINATION NUMBER | g243004 |
|---|---|
| GROUP NAME | distillation unit |
| NUMBER OF INCLUDED NODE | 22 |
| INCLUDED NODE | |
| NODE NUMBER | n102346 |
| | n102847 |
| | n102345 |

FIG.13

| EQUIPMENT NUMBER | DESIGN PRESSURE | DESIGN TEMPERATURE | | | |
|---|---|---|---|---|---|
| D-201 | 10.3K | 200°C | --- | --- | --- |
| D-202 | --- | --- | --- | --- | --- |

KNOWLEDGE BASE MANAGEMENT SYSTEM FOR AN INFORMATION REASONING APPARATUS

BACKGROUND OF THE INVENTION

This invention relates to a kind of technology which is effective when applied to management of secondary data in a knowledge base for intelligent information processing such as deductive reasoning.

With the recent development of memory technology and high-speed processors, the capacity and computational processing ability of engineering work stations (EWS) or the like have remarkably been improved. Utilization of an intelligent information processing system such as an expert system has therefore been expected. In the present situation, however, such a system cannot always be utilized by a user to obtain a satisfactory result.

This is because it is very difficult to form a large-scale knowledge base, more specifically, a knowledge base on a large amount of fact of actual objects. That is, there is a case of knowledge of a fact being expressed in various forms such as diagrams, flow sheets, figures and the like. Such data can not always be suitably processed by intelligent information processing.

For example, for computer-aided design/drawing of a large-scale plant facilities, it is necessary for conventional design systems to check the facilities with respect to safety and operational performance by inputting a large amount of information on elements of the facilities in a form suitable for knowledge processing with a computer separately of drawings prepared by CAD.

With respect to knowledge of rules and reasoning, needs for newly forming and adding knowledge may also arise frequently during the process of forming a knowledge base and performing knowledge processing. For example, if an accident occurs in a plant facility, it is necessary to search for a dangerous place in other facilities where a similar accident may take place to enable prevention of other similar accidents.

According to conventional methods for facility diagnosis or the like, some kinds of accidents are previously assumed and data and reasoning rules are correspondingly determined. It is therefore very difficult to cope with problems found later or newly appeared.

In conventional systems, it is difficult to directly utilize the information obtained by design- and drawing-employing CAD or the like to check, evaluate or search necessary items at a design- or drawing-inputting stage or the object obtained after the design, and drawing. It is basically necessary to manually input data Into a computer and to manually instruct the computer, because data obtained by design and drawing employing CAD and a knowledge base on facts of constituent elements expressed on drawings are separately formed and independent of each other.

For a large-scale design, a system may be arranged in which data on facts is input with respect to each target problem, and corresponding rules and knowledge are combined into a program. However, the development of such a system requires a great deal of labor for inputting data, and this system is therefore impracticable in terms of development time and cost.

The recent development of electronic computer systems has also enabled, for example, employing a computer-aided design (CAD) or the like project process in which information on the constructions and the shapes of component parts of a design object and the connective relationships between the component parts are input as drawings Into a computer; Literal/numerical information on design conditions, specifications and the like are accumulated into an engineering data base, and these categories of information are accumulated as primary data in the computer.

However, it is difficult to use such primary data as an object of intelligent information processing such as deductive reasoning, and there is a need to reprocess primary data to produce secondary data.

Secondary data thereby produced is, for example, knowledge data on facts expressed in the form of predicates for deductive reasoning. For the conversion of primary data into secondary data, primary data must be processed mainly by manual operations in conventional method.

When information is externally added to primary data to change specifications or the like, there is a need to repeat the operation for conversion into secondary data each time such information is supplied. In this type of system, therefore, the majority of the amount of intelligent information processing operation is assigned to this processing for conversion and re-formation into secondary data, resulting in a reduction in the efficiency of the main deductive reasoning processing.

SUMMARY OF THE INVENTION

In view of these problems, an object of the present invention is to provide a technique for effecting secondary data generation/reformation very efficiently.

According to one aspect of the present invention, there is provided a knowledge base management system for an information reasoning apparatus comprising (a) a primary data storage in which data comprising primary data on the shapes and specifications and other factors of figures supplied from one of an input means, an external data base and other means through a primary data Input section is stored, (b) a change registration section which, if data is added at said primary data input section or the data is changed at this section, records information representing this change. (c) a data conversion section which converts tile primary data into secondary data, (d) a knowledge base section having a secondary data storage for storing tile secondary data and a reasoning rule storage for storing reasoning rules, (e) a knowledge management section for controlling conversion processing of the conversion section, and (f) a reasoning calculation section for executing reasoning with respect to the data in the knowledge base section by an external instruction for retrieval inquiry or the like.

The knowledge management section monitors accessing from said reasoning calculation section to said knowledge base section, collates an accessed place with information from said change registration section, instructs said conversion section to perform corresponding data conversion processing and to store the converted data in said knowledge base section if it detects accessing to a place in the knowledge base section corresponding to the change data.

A knowledge base in which a very large amount of secondary data is accumulated is required to perform practical intelligent information processing. For example, such a knowledge base for equipment maintenance and safety control can be formed by converting primary data such as data of CAD drawings, an engineering data base or the like. It is necessary to maintain consistency and matching of such primary and secondary data. However, it is ordinarily possible that the primary data input time/place differ from the secondary data input time/place. The burden on the computer at the time of conversion from primary data into secondary data is large and the conversion is impossible if the processing performance is not sufficiently high.

There is also a possibility that a need for re-forming secondary data to maintain matching with primary data in intelligent information processing will arise. However, it is also possible that there is no or only a restricted part of a large amount of secondary data which necessitates such re-formation.

In accordance with the present invention, a conversion means such as that mentioned above for conversion from primary data to secondary data is provided by considering the present circumstances of intelligent Information processing using a knowledge base. Also, conversion into secondary data is not immediately effected even in a case where a change occurs in primary data in the primary data storage; primary data is converted at a stage of Intelligent information processing according to need or is collectively converted in a batch processing manner by delaying intelligent Information processing time through a corresponding length of time.

The present invention therefore enables efficient use of the system by preventing tile whole system From being used exclusively for conversion processing in case of primary data addition/changing.

BRIEF DESCRIPTION OF THE DRAWINGS

FIG. 3 shows correspondence tables in accordance with the first embodiment;

FIG. 4 is a diagram of a knowledge base in accordance with the first embodiment;

FIG. 5 is a diagram of the relationship between primary data, a primary data updating registration table and secondary data in accordance with the first embodiment;

FIG. 6 is a diagram of items of a data change registration table in the knowledge control section in accordance with the first embodiment;

FIG. 7 is a flowchart of a conversion process in accordance with the first embodiment;

FIG. 9 is a diagram of drawing data in accordance with the second embodiment;

FIG. 10 is a diagram of a figure information table in accordance with the second embodiment;

FIG. 11 is a connection information table in accordance with the second embodiment;

FIG. 12 is a table of group information in connection information in accordance with the second embodiment; and FIG. 13 is a table of an attribute table in accordance with the second embodiment.

DESCRIPTION OF THE PREFERRED EMBODIMENTS

Embodiment 1

This embodiment relates to a technique which is effective when applied to management of secondary data included in a knowledge base for intelligent information processing such as calculation reasoning In the field of basic design for electric circuit, actual plant piping or the like.

This embodiment of the present invention in which the present invention is applied to a basic design for actual plant piping and instrumentation will be described below.

Figure 1:
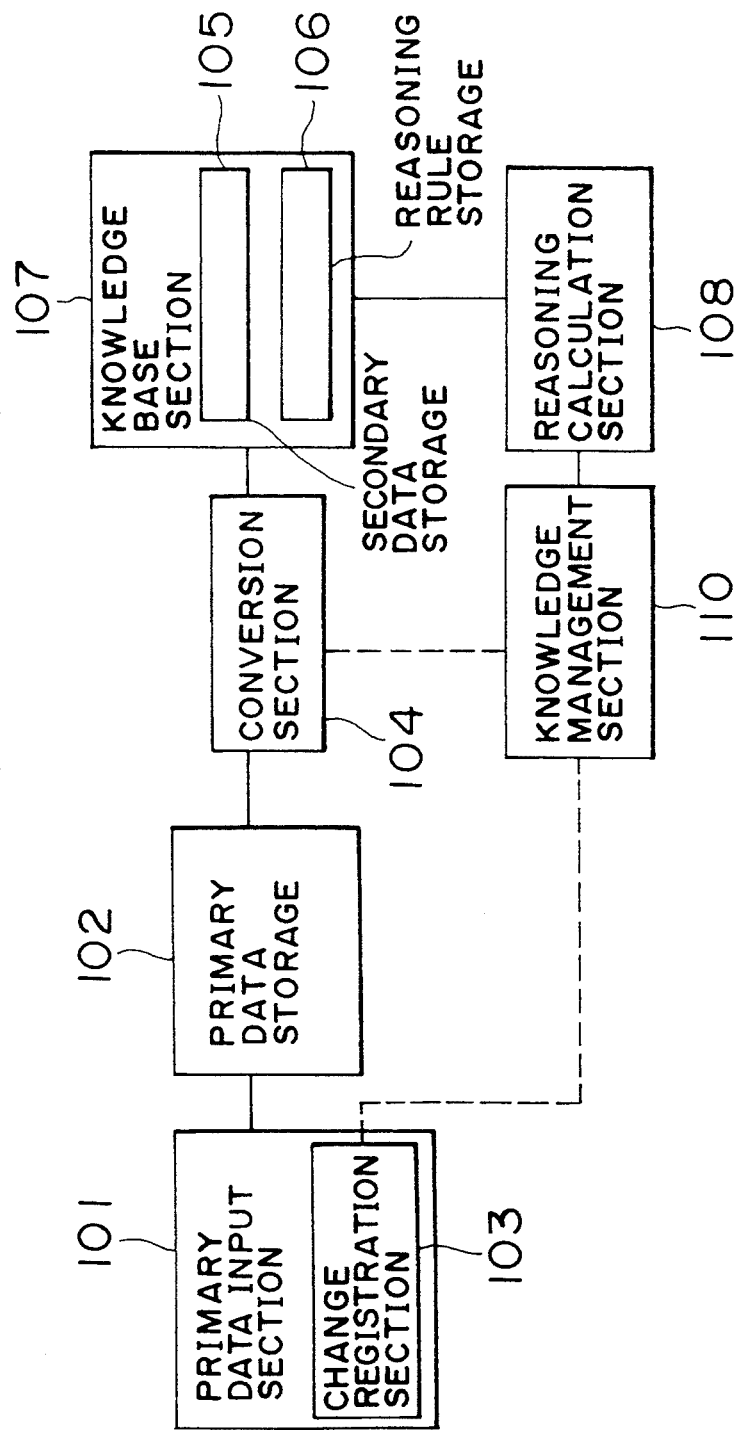
FIG. 1 is a block diagram of the construction of a system for an information reasoning apparatus in accordance with a first embodiment of the present invention.

FIG. 1 shows the construction of a system in accordance with this embodiment.

As shown in FIG. 1, a primary data input section 101 for inputting primary data such as information on figures, numerals and characters, a primary data storage section 102 for storing the primary data, a data conversion section 104, a knowledge management section 110, a knowledge base section 107, and a reasoning calculation section 108 are provided.

The primary data input section 101 includes a change registration section 103 for registerring information on formation, addition, change or the like of primary data in a knowledge management section 110.

Figure 2:
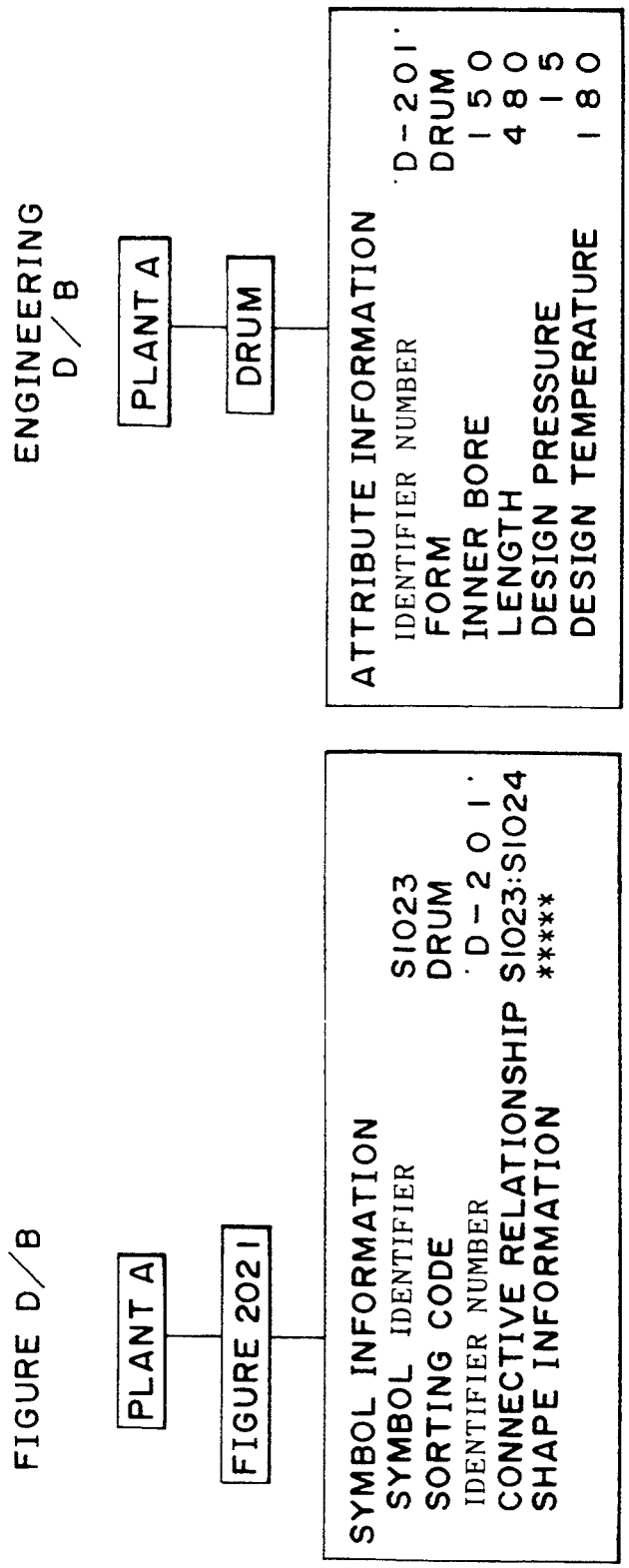
FIG. 2 is a diagram of a data base construction in accordance with the first embodiment.

For example, primary data is data, such as that shown in FIG. 2, representing drawings formed by CAD and may include symbol identifier numbers, identifier names, sorting codes representing significations, and information on the connective relationship between symbols, as well as information on figures and shapes. The primary data corresponds to transistor or condenser on electric circuit.

The primary data storage 102 stores, as primary data, a drawing data base and an engineering data base such as those shown in FIG. 2. As minimum units of the drawing data base, a symbol identifier, a sorting code, connective relationship information (indicating that the S1023 and S1024 are connected, in FIG. 2), shape information (image data) and the like are registered as symbol information. As minimum units of the engineering data base, an identifier number, and technical information, such as a form, an inner bore, a length, a pressure, and design temperature are registered.

In the primary data storage 102 are provided tables (FIG. 3) of correspondence with entitles, which are actual objects of knowledge base intelligent information processing of a knowledge base described later. The entitles are particular equipment units represented by "D-201" (this means number of Dram is 201) and the like in the above mentioned example relating to facility design and facility diagnosis.

Retrieval area limitation items and key items of primary data are not always consistent if a plurality of kinds of primary data base exist. However, the retrieval order is previously set with respect to the hierarchic relationship according to the relation of inclusion of data areas.

That is, as shown in FIG. 2, the drawing data base has a hierarchic structure of "drawing data base"→"plant"→"drawing"→"symbol identifier" while the engineering data base has a hierarchic structure of "engineering data base" "plant"→"equipment unit"→"equipment identifier".

A data conversion section 104 effects processing for converting the above-described primary data into secondary data used as fact data.

The conversion from primary data into secondary data in the data conversion section 104 is effected as described below. That is, primary data representing the shape, the connective relationship, the signification and the name of symbols or the like, which are elements of drawings in a diagram formed by CAD or the like, is converted into secondary data on facts, which are described, for example, in a predicate form and which indicate the correspondence between symbols Identifiers and entity identifiers, the correspondence between entity identifiers and sorting codes representing significations, the correspondence between entity identifiers and so no.

In a secondary data storage 105 in a knowledge base section 107 for storing secondary data, data is held in a form such as that shown in FIG. 4. This data is used as a knowledge base, i.e., the object of intelligent information processing.

Retrieval area limitation items and key items of secondary data are different from those of the above-described primary data. However, the retrieval order is set according to the relation of inclusion of data areas. For example, the hierarchic relationship in fact data (secondary data) in the knowledge base shown in FIG. 4 is as described below (the direction →: lower-class direction).

"Knowledge base". . . "plant"→"domain"→"entity identifier"

If the above described primary data or this data is supplied with additional data or is changed (hereinafter referred to simply as "updated"), the updated primary data is immediately reconverted by the data conversion section 104, and the secondary data is also updated so that matching between the primary data and the secondary data is maintained according to the ordinary method. In accordance with this embodiment, however, data conversion at the time of each primary data updating is not effected.

That is, in this embodiment, if the primary data is updated, only information on this updating is first registered in the change registration section 103. This primary data update information is registered with respect to data groups having a suitable size. If the primary data has a hierarchic structure, the update information is attached to upper-class data items of the primary data. For example, if the primary data has the following physical hierarchic structure (the direction →: lower-class direction):

"Data base"→"file"→"record"→"field", the update information is registered in the upper-classes inclusive of the "record".

For example, if the data is updated on the "record"unit, bits are set as the update status (flag) of the file and the data base in the upper-classes to indicate "update".

FIG. 5 shows the relationship between the primary data, the update information and the secondary data described above. FIG. 6 shows examples of items of a data change registration table prepared in the knowledge management section 110.

A conversion process in accordance with this embodiment will now be described below with reference to FIG. 7. When a reasoning calculation subsection 108 is supplied with a retrieval inquiry formula, it accesses the knowledge data base in the secondary data storage 105 by referring to reasoning rules in a reasoning rule storage 106 In the data base section.

Collation required for reasoning (intelligent information processing) by determining whether fact data (secondary data) corresponds to changed data is performed in such a manner that the update status of the updating information stored in the knowledge management section 110 is collated successively from the upper-class data item to the lower-class data item to which this data belongs. If a non-updated state is confirmed at the stage of the upper-class data item, collation of the updating status with respect to lower-class data items is stopped. Thus, if the secondary data is not updated, accessing to the knowledge base by the reasoning calculation subsection 108 continues.

If in this process it is determined that the accessed place corresponds to the changed part of the data, the knowledge management section 110 reads out the changed primary data corresponding to this part from the primary data storage 102, and outputs a conversion instruction to the data conversion section 104. The data conversion section 104 then converts this primary data into new secondary data, and stores this data in the secondary data storage 105 of the knowledge base section 107, thereby updating the corresponding part of the secondary data.

In this process, processing for converting the changed primary data is performed by being successively collated with the update status by the knowledge management section 110. However, the arrangement may be such that when in the knowledge management section 110 the reasoning calculation subsection 108 is informed of the accessed place, intelligent information processing is delayed to effect conversion/storage of a data area including the changed data in a batch processing manner. Such batch processing may be performed collectively in accordance with an instruction from the operator. This arrangement is specifically effective in a case where a large amount of primary data is added or updated or in a case where there is a need to perform processing while the designer confirms the design content in the design process, i.e., step-by-step checking.

Further, a timer may be provided for conversion in a certain cycle in a batch processing manner. If a timer is provided for this purpose, a statistical result of the frequency of accessing to the knowledge base 107 may be recorded and the period of time for batch processing may be set to a period in which the accessing frequency is small. It is thereby possible to efficiently use the whole system.

If primary data of other data bases are converted into fact data, additional data may be externally supplied.

In the above-described embodiment, one secondary data storage 105 is connected with respect to one primary data storage 102. However, the present invention is not limited to this, and includes a system in which a plurality of knowledge base sections 107 are distributed, i.e., a distributed data base system. In such a distributed data base system, when data in a first secondary data storage 105 is changed, the operation of other secondary data storages 105 unrelated to the first data storage are not stopped by conversion processing. It is therefore possible to use the system at an improved efficiency.

Thus, the information processing system for performing intelligent Information processing such as deductive reasoning in accordance with the present Invention is capable of forming and controlling fact data constituting a knowledge base at a very high efficiency.

Embodiment 2

This embodiment of the present invention In which the present invention is applied to a basic design for actual plant piping and instrumentation will be described below.

Figure 8:
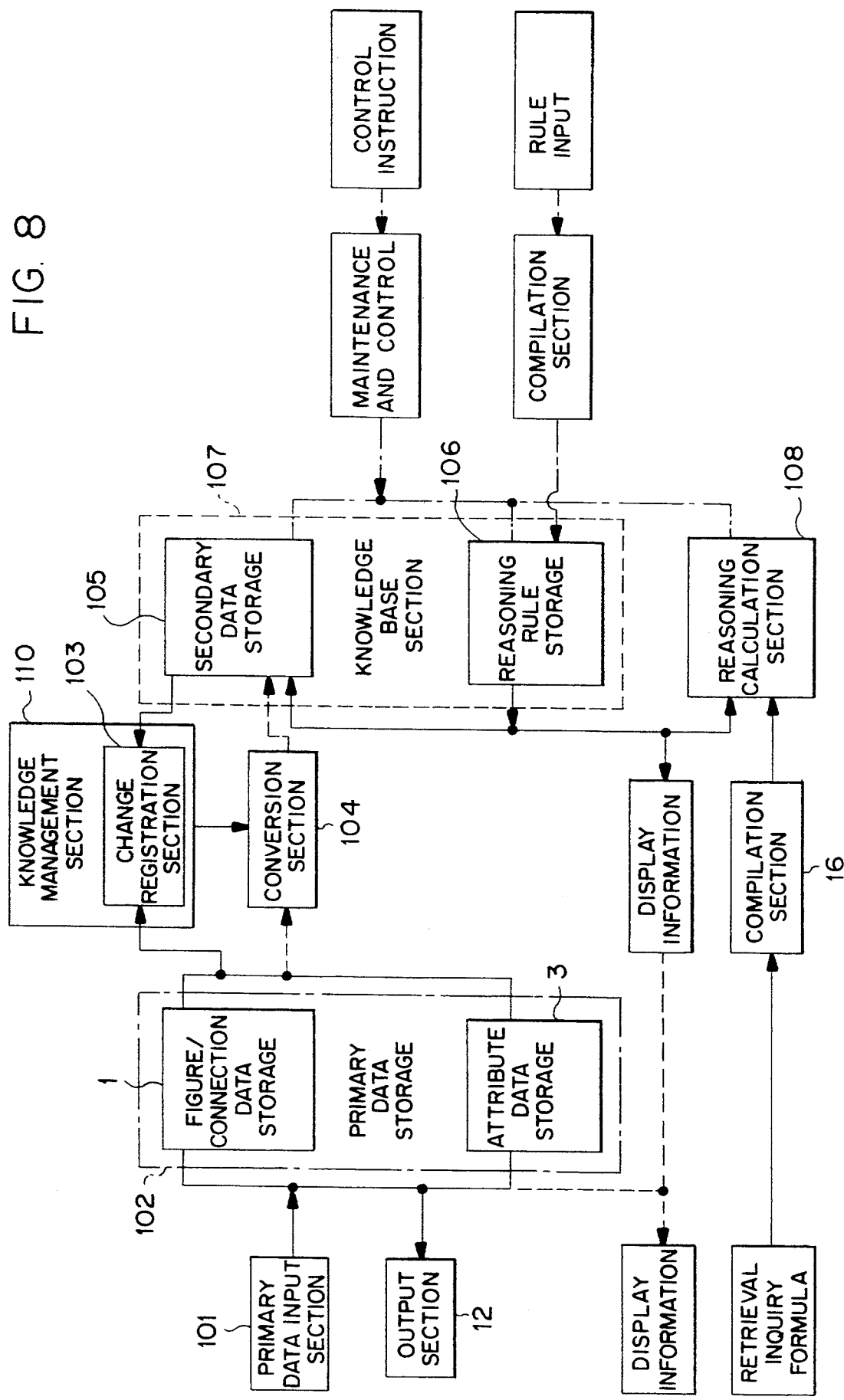
FIG. 8 is a block diagram of tile construction of a system in accordance with a second embodiment of the present invention.

FIG. 8 is a diagram of the construction of a processor in accordance with the second embodiment. The description for the same blocks as those shown in FIG. 1 will not be repeated.

FIG. 9 shows a portion of an equipment-piping system which is represented by data stored in figure/connection data storage section 1 of a primary data storage 102. In FIG. 9, a tower 14 and a drum 13 is connected by a piping 15. A design figure such as that shown In FIG. 9 can be drawn by a figure input means which is known per se through a primary data input section 101 having an Input means such as a mouse, a digitizer or the like.

A CRT or the like is ordinarily used as a display unit for a display section. A display unit such as a CRT can also be used as output section 12 as in the case of the display section.

FIG. 10 shows a figure information table which may be provided in any form but which has at least a particular identifier such as a node number for discriminating a symbol in it. An identifier such as a classification code for discriminating the signification of the symbol, and information on primitives such as a straight line and a circular-arc. A portion code representing the signification of each primitive and a group number for discriminating a group of symbols may be added according to need.

FIGS. 11 and 12 show a connective relationship information table and a table of group information in the connective relationship information which clarify the connective relationship between symbols. The position at which a symbol is connected may be indicated as a primitive according to need.

FIG. 13 shows an example of an attribute table stored in the attribute table storage. In FIG. 13, a design pressure of and a set temperature of a drum indicated as attribute data by a identifier (number) "D-201" are 10.3 kg/cm$^2$G and 200° C., respectively. Such attribute data can be registered in a well-known data form such as a table or a field or a relational data base.

In the data conversion section 104, fact data items such as those shown below are generated based on figure/connection data such as that shown in FIG. 9 formed by design-, drawing-inputting and attribute data stored in primary data storage 102.

| KEY (n102346, D-201) | (data 1) |
| node (n102346, c101) | (data 2) |
| node (n102345, c201) | (data 3) |
| node (n102347 c300) | (data 4) |
| joint (n102346, n102347) | (data 5) |
| joint (n102347, n102345) | (data 6) |
| conn (n102346, b2, n102347, b1) | (data 7) |
| conn (n102347, b1, n102345, b2) | (data 8) |
| attr (D0201', dp, ty0, un141, 10.3) | (data 9) |
| attr (D0201', op, ty0, un141, 12.7) | (data 10) |
| attr (D0201', dt, ty0, un11, 200) | (data 11) |

Significations of these data items are as shown below.

Data 1: the equipment number of symbol n102346 on the diagram is D-201.

Data 2: the classification code of symbol n102346 is c101 (drum 14).

Data 3: symbol n102345 is c201 (tower 13).

Data 4: symbol n102347 is c300 (piping 15).

Data 5: n102346 and n102347 are connected.

Data 6: n102347 and n102345 are connected.

Data 7: n102346 and n102347 are connected at positions 2 and 1.

Data 8: n102347 and n102345 are connected at positions 1 and 2.

Data 9: the design pressure of D-201 is 10.3 kg/cm$^2$G.

Data 10: the design temperature of D-201 is 200° C.

Data 11: the operating pressure of D-201 is 12.7 kg/cm$^2$G.

nXXXXXX (X: a numeral) represents a node number and is an identifier number peculiar to each symbol in CAD diagrams.

Predicate rules in the reasoning rule storage 106 are registered in the form of declaration words in the knowledge base section 108.

That is, an expression "if A is established, then B is established" is shown as "A: —B", and an expression "if A and B are established, then C is established" is shown as "C: —A, B". Examples of these expression are shown below.

| | |
|---|---|
| drum(X): -node (X, c101). | (rule 1) |
| equipment(X): -drum (X). | (rule 2) |
| un-safe-equipment(X, Y): | (rule 3) |
| -equipment (X), key (X, Y), | |
| attr (Y, dp, z, un141, pd), | |
| attr (Y, op, z, un141, Po), | |
| Po < Po. | |

Each of these rules signifies as described below.

Rule 1: Symbol (node) of sorting code c101 represents a drum.

Rule 2: Drum is an equipment unit.

Rule 3: An equipment unit having an operating pressure higher than the design pressure is dangerous.

Such predicate rules may be previously registered as ordinary rules in the reasoning rule storage 106 or may be input as additional rules when a retrieval inquiry formula is input. Predicate rules externally given in a text form are translated into a form suitable for high-speed retrieval by a deductive data base method to be stored (registered) in the reasoning rule storage 106.

An example of retrieval inquiry supplied to the reasoning calculation subsection 108 is shown below. By the following inquiry, the node number and the equipment number of an unsafe equipment unit are retrieved.

:-un-safe-equipment(X, Y) (inquiry 1)

Inquiry 1 input in the predicate form is compiled and translated into a form suitable for high-speed retrieval in a compilation section 16, and is thereafter supplied to the reasoning calculation subsection 108. The reasoning calculation subsection 108 retrieves a corresponding fact based on fact data and predicate rules in response to the inquiry and forms a retrieval result as fact data.

The calculation processing in the reasoning calculation subsection 108 will be schematically described below. First, deductive reasoning is effected by referring to each predicate rule in the reasoning rule storage 106.

In this case, rule 3 is referred to in response to inquiry 1. According to rule 3, it can be understood that to retrieve a "dangerous equipment unit", an "equipment unit having an operating pressure higher than the design pressure" may be extracted.

Next, a drum node corresponding to the equipment unit is retrieved according to rule 2. At this time, it is understood from rule 3 that the corresponding node is a node defined with sorting code "c101", and it is found from data 2 that node "n102346" is a drum. Further, it is found from data 1 that this equipment number of this drum is "D-201".

Attribute data with respect to drum "D-201" is retrieved and the design pressure and the operating pressure are compared based on data 9 and data 11, thereby determining that the drum "D-201" corresponds to the dangerous equipment. By this retrieval, the reasoning calculation subsection 108 outputs the following retrieval result:

:-un-safe-equipment(n102346, D-201') (output 1)

This output indicates that the node number of the unsafe equipment unit is "n102346" and the corresponding equipment number is "D-201" (drum 14).

The reasoning calculation subsection 108 may display a diagram on the CRT in which the corresponding portion 1s distinctively shown by coloring. In this case, display information from the knowledge base section may be output by an instruction from reasoning calculation section 108. In this case, color code can be added as bundle information to the node number. For example, display data is output with respect to node numbers and color codes, "(n102346,7)., (n102345,1).)" in this example, "n102346" is an unsafe node and the symbol of this node is displayed in red (color code: 7), and "n102345" is a safe node and the symbols of this node is displayed in green (color code: 1).

In the above description, an unsafe portion of piping 15 is indicated based on fact data found by retrieving. There are other kinds of executable retrieving, e.g., retrieving for displaying only the same types of valves distinctively by coloring, retrieving with respect to a same-pressure area possible for finding a group of equipment units and piping 15 connected without valves, retrieving with respect to an area including equipment units and piping 15 having a low design pressure in a same-pressure possible area, and safety device for finding safety valves connected to equipment units.

In the above-described embodiment, the present invention is applied to a piping plant. However, the present invention is not limited to this and can also be utilized for electric (electronic) circuit design, air-conditioning equipment piping design and the like.

The knowledge management section 110 has a change registration section 103 which has a function of registerring, if the content of primary data such as flow sheet CAD data or a drawling data base registered in the primary data storage 102 is changed, only information which indicates the data has been changed in a log.

The most distinctive feature of this embodiment resides in a method of controlling data in the knowledge base section 107.

That is, in this embodiment, if a part of primary data is changed by a specification change, the conversion section 104 registers only the fact of this change as a log in the change registration section 103 in the conversion knowledge control section 110, and does not update the fact data in the knowledge base section 107 at this stage.

When a retrieval inquiry formula is supplied to the reasoning calculation subsection 108 to start retrieval processing, the knowledge control section 110 always refers to the knowledge base section 107 to collate an access from the reasoning calculation subsection 108 to the secondary data storage 105 with change information in its change information registration section 103. If with respect to accessed fact data, primary data which is the basis of this fact data has been changed, the knowledge control section 110 temporarily stops accessing from the deductive reasoning control section 1, outputs a conversion instruction to the data conversion section 104 to convert the corresponding primary data, and registers the converted data in the secondary data storage 105 of the knowledge base section 107, thereby updating this storage.

FIG. 7 is a flowchart of this process. Thus, in this embodiment, if primary data in the primary data storage 102 has been changed, conversion processing is executed at the retrieval stage according to need without immediately converting the primary data into fact data.

That is, although a very large amount of data is stored in the knowledge base, the fact data accessed by actual retrieval processing is only a small part of the data in the knowledge base.

Accordingly, if the conversion in the data conversion section 104 is executed each time primary data is changed, which data is changed comparatively frequently, the burden on the processor is increased by conversion processing alone and there is a possibility of a considerable reduction in retrieval processing speed.

in accordance with this embodiment, by considering this problem, the conversion processing in the conversion section 104 is executed only when It is required during retrieval processing, thereby achieving a very high processing efficiency.

Specifically, in the case of a distributed data base in which a plurality of knowledge base section 107 are distributed, when primary data in a first knowledge base is changed, the operation of a second knowledge base unrelated to the first data base is not stopped by conversion processing. It is therefore possible to use the system at an improved efficiency.

in the above-described second embodiment, each time a data change place in the knowledge base section 107 is accessed, changed data is read out from the primary data storage 102 to be converted into fact data. However, the arrangement may be such that when the knowledge management 110 is informed that an accessed part of fact data corresponds to the changed part, a changed area including the changed data is collectively processed in a batch processing manner.

Also, conversion storing may be performed collectively by an external instruction or timer control.

What is claimed is:

1. A method of managing a knowledge base system, comprising the steps of:
 (a) storing primary data received from one of an input means and an external data base;
 (b) converting said primary data into secondary data using a data conversion section, said secondary data having a data format compatible with said knowledge base system;
 (c) storing said secondary data;
 (d) storing added or updated primary date received from one of an input means and an external data base;
 (e) recording change data indicating which of said primary data has been added or updated;
 (f) accessing said secondary data based on a received retrieval inquiry;
 (g) collating said accessing of said secondary data with said recorded change data; and (h) controlling said data conversion section to convert said primary data corresponding to said secondary data to be accessed in said step (f) when said recorded change data indicates that said primary data corresponding to said secondary data to be accessed in said step (f) has been added or updated.

2. The method of claim 1, further comprising the step of (i) delaying said step (f) until said data conversion section completes conversion according to said steps (g) and (h).

3. The method of claim 1, further comprising the step of (i) controlling said data conversion section to convert said primary data which said recorded change data indicates has been added or updated when a timer indicates expiration of a predetermined time period.

4. The method of claim 1, further comprising the step of (i) periodically controlling said data conversion section to convert said primary data which said recorded change data indicates has been added or updated.

5. The method of claim 1, wherein said step (e) comprises the steps of:
(e1) forming a data change registration table corresponding to a hierarchical structure of said primary data based on said recorded change data; and
(e2) registering an update status for said primary data of upper hierarchy when said recorded change data indicates that said primary data of lower hierarchy belonging to said primary data of said upper hierarchy has been changed.

6. The method of claim 1, wherein said step (h) interrupts performance of said step (f).

7. The method of claim 1, wherein said step (f) accesses said secondary data according to predicate rules based on said received retrieval inquiry, said predicate rules defining concepts and rules for retrieval reasoning, said received retrieval inquiry including an inquiry formula.

8. A knowledge base management system for managing a knowledge base system, comprising:
a primary data storage section storing primary data received from one of an input means and an external data base, said primary data storage section storing added or updated primary data received from one of an input means and an external data base;
a change registration section recording change data indicating which of said primary data has been added or updated;
a data conversion section converting said primary data into secondary data, said secondary data having a data format compatible with said knowledge base system;
a knowledge base section having a secondary data storage section storing said secondary data;
a reasoning calculation section accessing said secondary data according to reasoning rules based on a received retrieval inquiry;
a knowledge management section controlling said conversion section, said knowledge management section controlling said conversion section to convert said primary data corresponding to said secondary data to be accessed by said reasoning calculating section when said recorded change data indicates that said primary data corresponding to said secondary data to be accessed by said reasoning calculating section has been added or updated.

9. The system of claim 8, wherein said knowledge management section delays accessing performed by said reasoning calculating section until said data conversion section completes conversion.

10. The system of claim 8, wherein said knowledge management section controls said data conversion section to convert said primary data which said recorded change data indicates has been added or updated when a timer indicates expiration of a predetermined time period.

11. The system of claim 8, wherein said knowledge management section periodically controls said data conversion section to convert said primary data which said recorded change data indicates has been added or updated.

12. The system of claim 8, wherein said knowledge management section forms a data change registration table corresponding to a hierarchical structure of said primary data based on said recorded change data, registers an update status for said primary data of upper hierarchy when said recorded change data indicates that said primary data of lower hierarchy belonging to said primary data of said upper hierarchy has been added or updated, and controls said data conversion section based on said update statuses.

13. The system of claim 8, wherein
said primary data storage section stores primary data on design diagrams, said primary data including connection data and attribute data, said connection data including data on connections between equipment as represented by symbols in said design diagrams, said attribute data including design specifications on said equipment; and further comprising
a display displaying said secondary data as design diagrams.

14. The system of claim 8, wherein said reasoning calculating section accesses said secondary data according to predicate rules based on said received retrieval inquiry, said predicate rules defining concepts and rules for retrieval reasoning, said received retrieval inquiry including an inquiry formula.

* * * * *